United States Patent

Lou et al.

Patent Number: 5,999,391
Date of Patent: Dec. 7, 1999

[54] OUTAGE DEVICE AND SURGE PROTECTION USING THE SAME

[75] Inventors: Chin-Kuan Lou; Sen-Hsiang Liu, both of Taipei Hsien, Taiwan

[73] Assignee: Primax Electronics Ltd., Taiwan

[21] Appl. No.: 09/063,921

[22] Filed: Apr. 21, 1998

[30] Foreign Application Priority Data

Mar. 13, 1998 [TW] Taiwan ................................. 87103704

[51] Int. Cl.$^6$ ....................................................... H02H 5/00
[52] U.S. Cl. ............................ 361/103; 361/111; 361/118
[58] Field of Search ................................ 361/56, 91, 111, 361/115, 118, 119, 127, 120, 103, 104, 105, 106, 23, 24, 25

[56] References Cited

U.S. PATENT DOCUMENTS 4,292,617  9/1981  McVey ..................................... 337/407
4,903,295  2/1990  Shannon et al. ......................... 379/437

*Primary Examiner*—Stephen W Jackson
*Attorney, Agent, or Firm*—Blakely Sokoloff Taylor & Zafman

[57] ABSTRACT

An outage device and a surge-protection that uses the outage device, wherein the outage device is formed by connecting an overcurrent protection and an overheat protection in series, and packaged as a single device. As soon as either the current flowing through the overcurrent protection is too high or the temperature detected by the overheat protection is to high, the outage device forms a open circuit immediately to ensure that no currents are fed into the circuit. The surge protection is formed by connecting the foregoing outage device and a surge-absorbing device in series. The outage device and the surge-absorbing device have to be placed as close as possible, so that the outage device can open the circuit immediately as the temperature of the surge-absorbing device is to high to ensure that no currents are fed into the surge-absorbing device.

13 Claims, 2 Drawing Sheets

OUTAGE DEVICE AND SURGE PROTECTION USING THE SAME

CROSS-REFERENCE TO RELATED APPLICATION

This application claims the priority benefit of Taiwan application Ser. No. 87103704, filed Mar. 13, 1998, the full disclosure of which is incorporated herein by reference.

BACKGROUND OF THE INVENTION

1. Field of the Invention

This invention relates to a circuit protection device, and more particularly, to an outage device having an overcurrent protection and an overheat protection, and to a surge protection using the outage device.

2. Description of Related Art

As the electronics circuits have become more complicated, and electronics devices have become more precise nowadays, a power supply has to meet a stricter requirement to work with a electronics circuit. Ideally, the current and voltage from a power supply are supposed to be perfect sine or cosine waves, but this perfect power supply doesn't exist in reality. Normally, the voltage output of a power supply is not very steady, and sometimes, there are even power surge accompanied with the output voltage. This accompanied power surge often causes errors on precise electronics devices or even burns down those electronics devices. To resolve this problem, a surge-absorbing device is normally added into circuit designs to absorb power surge for ensuring the regular operations of the loads. In a real world application, a metal oxide varistor (MOV) is often in parallel with the power supply as a surge-absorbing device. The impedance of a MOV is very high when its cross voltage is below a certain predetermined voltage level, that is, there is almost no current flowing through the MOV, that is, the MOV doesn't affect the load at all. As soon as the cross voltage of the MOV, such as a power surge, exceeds the certain predetermined voltage level, the impedance of the MOV toboggans immediately, and most of the supplied current including the power surge is bypassed by the MOV, as a result, the load is protected by the MOV from receiving a power surge, and the load voltage is then remained under a predetermined voltage level.

Referring to FIG. 1A, a MOV 100 is in parallel with the load. In the presence of a power surge, most of the current from power supply including the power surge bypasses the load through the MOV because the impedance of the MOV toboggans immediately. The voltage across the load is then remained under a predetermined voltage level by using a MOV to bypass power surges.

Generally, the temperature on the MOV is increased because the MOV executes the surge-absorbing operation frequently when the supplied voltage is not steady. The MOV will be burned down if the temperature exceeds a certain value. Hence, how to maintain the continuous operation of a circuit under the protection of a MOV has become a pretty important topic. Not only a high temperature can burn down a MOV, a strong current can damage a MOV as well. Furthermore, the circuit is not certainly opened, that is, the burned MOV can still possibly short the circuit and causes a large current. Moreover, since the characteristics of the MOV are changed after it is burned down, a leaking current might happen and affect the circuit near by. Because the MOV is in parallel with the power supply and used as a circuit protection, it is very important to have the MOV pass the test of UL1449 safety regulation to ensure the quality for providing a better protection to the circuits.

However, the previous UL1449 safety regulation was not very rigid, as a result, burning down and explosion still happened on some passed MOV devices. A burned MOV might short the circuit and further generate an arc that can cause more damage to a circuit. Hence, the UL1449 safety regulation has been reviewed and improved into the currently used second edition UL1449 safety regulation.

Within the new UL1449 safety regulation, there are two additional destructive tests. The first test is to feed a huge pulse (1000 A, 240V) into a MOV to blow it and then observe the damage on the MOV. The second test is to feed a gradual increased current (240V, 0.125 A, 0.5 A, 2.5 A, 5 A) to a MOV, and then check the responses of the MOV. The leaking current has to be below 0.5 mV to pass the safety regulation.

Referring to FIG. 1B, a current fuse 120 is in series with a MOV 100. A current flows through a properly selected current fuse 120 before it is fed into the MOV 100, wherein the current fuse 120 is used as a overcurrent protection of the MOV 100. The specification of the current fuse is selected to meet the actual requirement. When the current from the power supply is higher than a predetermined value, i.e., the breaking point of the current fuse, the current fuse is burned down to open the circuit and current can no longer be fed into the MOV 100. Even though the MOV 100 is also burned down by a big current, the circuit is protected from being damaged by a short current created by a broken MOV. Hence, the primary function of the current fuse 120 is to be used as a fast-breaking fuse that breaks itself immediately in the presence of a big current for avoiding a short current.

Referring to FIG. 1C, a temperature fuse 140 is in series with the MOV 100, so a current fed into the MOV 100 has to flow through the temperature fuse first. On the circuit board layout, the temperature fuse and the MOV are separated by a small distance. The temperature fuse 140 is used to detect the temperature on the MOV 100, because the temperature fuse 140 and the MOV 100 are very close to each other. The specification of the temperature fuse 140, which is used as an overheat protection of the MOV 100, is selected properly according to the actual requirement. As soon as the a detected temperature on the MOV 100 exceed the predetermined temperature, the breaking point of the temperature fuse, the temperature fuse is burned down to open the circuit for preventing the temperature over the MOV 100 from increasing. The distance between the temperature fuse 140 and the MOV 100 can be very small, or even zero that means the temperature fuse 140 is on contact with the MOV 100 for detecting the temperature over the MOV directly. Since the increment of temperature is gradual, the primary function of the temperature fuse 140 is to be used as a slow-breaking fuse which breaks itself when the detected temperature is too high to open the circuit for preventing the MOV 100 from being burned down by high temperature.

In a real application, normally a current fuse or a temperature fuse is in series with a MOV as a fast-breaking overcurrent protection or a slow-breaking overheat protection. Conventionally, besides using current fuse as the overcurrent protection, a fine conductive wire on the circuit board can be used as an overcurrent protection as well. When a high current flows through the fine conductive wire, the fine conductive wire is melted and then forms a outage circuit for protecting the MOV from damage. However, the quality of this method is difficult to be controlled which often leads to a result that the characteristics of the circuit cannot be followed precisely. Furthermore, melting the conductive wire causes a permanent damage that makes it difficult to recover and maintain damaged devices. In addition, a conventional method normally has only either a current fuse or temperature fuse in series with the MOV as a protection, which cannot effectively protect the circuit from both overcurrent and overheat. Even though it is possible that having both current fuse and temperature fuse built into a circuit to provide overcurrent and overheat protection, it increases the complication of a circuit, storing and managing cost, and decreases the competition of products.

According to the foregoing, the conventional method includes at least the following disadvantages:

1. the conventional method can only provide either overcurrent or overheat protection to a circuit, wherein the protection is not enough to protect a circuit.
2. using both current fuse and temperature fuse provides a circuit with a double protection, but it increases the complication of a circuit, storing and managing cost, and decreases the competition of products.
3. using a fine conductive wire on the circuit board as a current fuse is difficult to control the quality of protection and characteristics of a circuit, and causes the difficulty on maintenance.

SUMMARY OF THE INVENTION

It is therefore an objective of the present invention to provide an outage device using only one component for protecting a circuit from overcurrent and overheat to reduce storing and managing cost and increase the competition of products.

It is another objective of the present invention to provide a surge protection to absorb power surges from power supply for ensuring the operation of a circuit. The present invention also protects a circuit from overcurrent and overheats.

In accordance with the foregoing and other objectives of the present invention, the present invention provides an outage device, which has a current protection and a temperature protection in series and packaged into an independent device. As the current flowing through the current protection is too strong, or the temperature detected by the temperature protection is too high, the outage device opens the circuit to provide overcurrent and overheat protection to a circuit. The present invention can also reduce the storing and managing cost, and increase the competition of products.

In accordance with the foregoing and other objectives of the present invention, the present invention provides a surge-absorbing apparatus using the outage device, wherein the outage device is in series with a surge-absorbing device. The surge-absorbing apparatus is in parallel with the power supply for absorbing power surges to ensure the function of the load, wherein the outage device prevents the surge-absorbing device for the damage caused by overheat, and opens the current protection immediately in the presence of a big current to eliminate the occurrence of short currents by stopping the current from flowing into the surge protection.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1A:
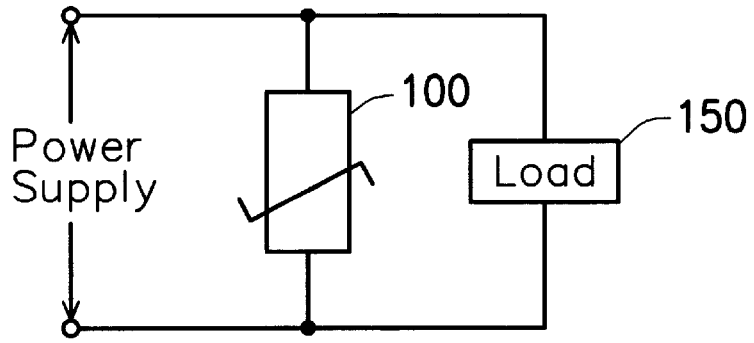
FIG. 1A is a diagram showing a conventional connection of a MOV and a circuit.
Figure 1B:
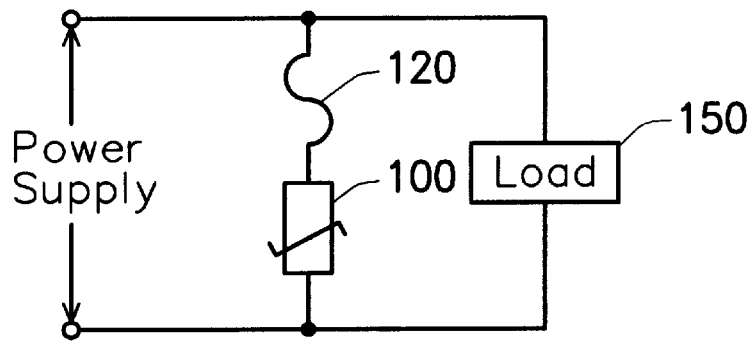
FIG. 1B is a diagram showing a current fuse in series with a MOV.
Figure 1C:
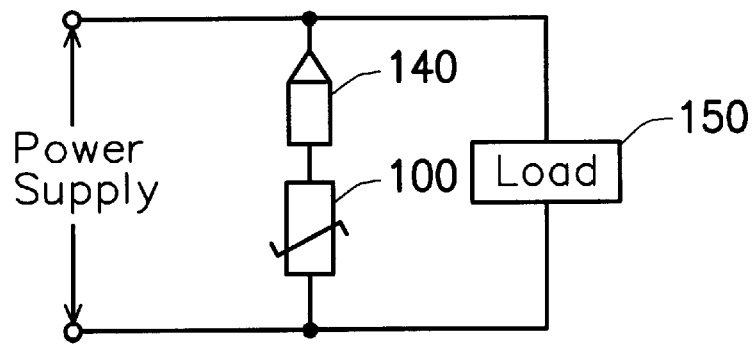
FIG. 1C is a diagram showing a temperature fuse in series with a MOV.
Figure 2:
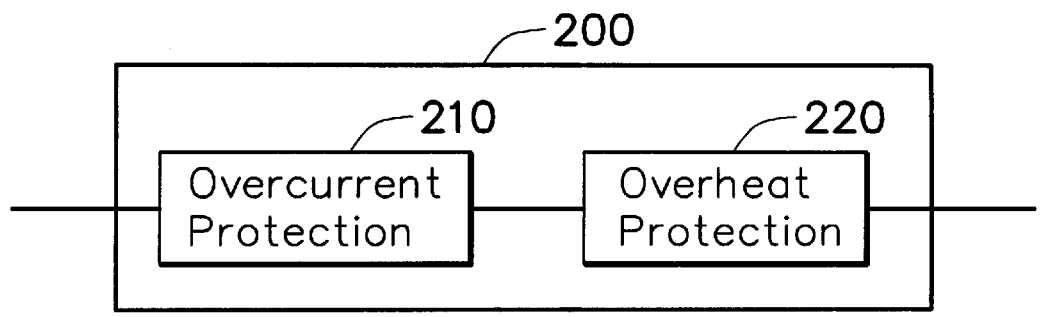
FIG. 2 is a diagram showing the outage device used in a preferred embodiment according to the invention.

Referring to FIG. 2 which shows an outage device used in a preferred embodiment according to the present invention, outage device 200 is formed by setting a overcurrent protection 210 and a overheat protection 220 in parallel, wherein the overcurrent protection 210 includes a conventional current fuse, and the overheat protection 220 includes a conventional temperature fuse. If the current flowing through the overcurrent protection is too strong, or the temperature detected by the overheat protection is too high, the outage device 200 is opened immediately for providing a circuit with overcurrent and overheat protection. The outage device is an independent device which is constructed by connecting a overcurrent protection 210 and a overheat protection 220 in series, and then packaging them. It reduces the storing, managing, and assembling cost, and increases the competition of products using a single independent device to achieve both overcurrent protection and overheat protection. The method for packaging the outage device 200 includes using heat-shrink tube, or other methods that are capable of achieving the similar objective. Packaging a combination of a overcurrent protection 210 and a overheat protection 220 in series into a single independent device is one of the important skills of the present invention.

Figure 3:
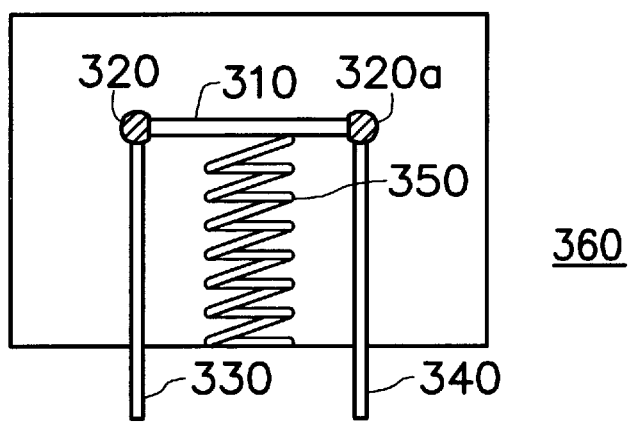
FIG. 3 is a diagram showing the outage device used in another preferred embodiment according to the invention.

Referring to FIG. 3 which shows an outage device 360 used in another preferred embodiment according to the present invention, the outage device 360 has a first connecting wire 330 and a second connecting wire 340 for connecting the outage device and outside circuit. The first connecting wire 330 connects to a current fuse 310 through a thermal-sensitive connecting point 320, and the second connecting wire 340 connects to the current fuse 310 through another thermal-sensitive connecting point 320a so that a close loop is formed between the first connecting wire 330 and the second connecting wire 340. An elastic device 350 contacts the current fuse 310 and applies elastic force on the current fuse 310 constantly, wherein the elastic device 350 includes a spring or a valve of a properly selected size. The outage device 360 can be connected to a surge-absorbing device such as a MOV to prevent the surge-absorbing device from overcurrent and overheat.

As the outage device 360 in series with MOV, a current is fed into the MOV through the current fuse 310, wherein the specification of the current fuse is selected to meet the actual requirement. As soon as the current flowing through the current fuse 310 exceeds the predetermined voltage, the breaking point of the current fuse, the current fuse is then burned down and an outage is formed to avoid current from being fed into the MOV, and eliminate the occurrence of a short current.

Furthermore, the positions of the outage device 360 and the MOV are separated by a very short distance so that the outage device can detect the temperature of the MOV. As soon as the temperature of the MOV exceeds a predetermined temperature, the breaking point of the connecting point, the connecting point 320 melts and a outage id formed by the elastic force from the elastic device 350. Of course, the distance separating the outage device and the MOV can be zero. The connecting pointer 320 and the connecting point 320a are made of similar materials such as welding materials.

Figure 4:
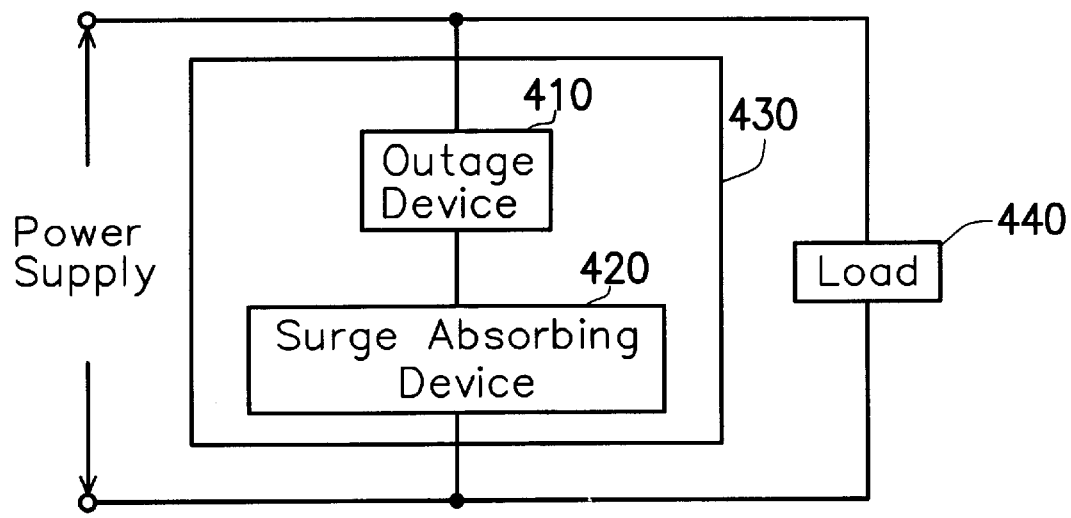
FIG. 4 is a diagram showing the surge protection used in a preferred embodiment according to the invention.

Referring to FIG. 4 which shows a surge protection 430 used in another embodiment according to the present invention, the surge protection 430 is formed by connecting a outage device 410 and a surge-absorbing device 420 in series, wherein the outage device 410 includes the outage device 200 shown in FIG. 2, the outage device 360 shown in FIG. 3, or another devices having the similar functions, wherein the surge-absorbing device 420 includes a MOV. As shown in the diagram, the surge protection 430 is in parallel with load. In the presence of a power surge, the resistance of the surge protection 430 drops immediately, and most of the current from power supply is bypassed through the surge protection 430, so the voltage level across the load remains under the predetermined voltage level. The outage device 410 is in series with the surge-absorbing device within the surge protection 430 to protect the surge-absorbing device from overcurrent and overheat. Notice that the outage device 410 and the surge-absorbing device 420 can be set next to each other, or further be packaged into one single independent device for reducing the complication of circuit design, storing and managing cost, and increasing the competition of products. The foregoing packaging method includes using the heat-shrink tube. When the surge-absorbing device 420 is burned down by an overcurrent, in the mean time, the outage device 410 is opened to prevent the circuit from further damage caused by short current or arc. Ensuring that no currents can be fed into the surge protection after the surge-absorbing device is burned down is one of the important technical characteristics of the present invention.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An outage device comprising:

an overcurrent protection, for detecting a current flowing through the overcurrent protection;

an overheat protection, for detecting a temperature surrounding the overheat protection, in series with the overcurrent protection, wherein the overcurrent protection and the overheat protection are packaged as a single independent device; and an elastic device contacting the overcurrent protection and applying elastic force to the overcurrent protection wherein under a situation in which either the current is too high or the temperature is too high, the elastic device separating the overcurrent protection by elastic force causes the outage device to be opened.

2. The outage device of claim 1, wherein the overcurrent protection includes a current fuse.

3. The outage device of claim 1, wherein the overheat protection includes a temperature fuse.

4. An outage device comprising:

a current fuse, for detecting a current flowing through the current fuse;

a temperature fuse, for detecting a temperature surrounding the temperature fuse, is in a series with the current fuse, wherein the current fuse and the temperature fuse are packaged as a single independent device; and an elastic device, contacting the current fuse and applying elastic force on the current fuse constantly, wherein when the current fuse melts as the current exceeds a predetermined value, or the temperature fuse melts as the temperature exceeds a predetermined value, then the elastic device separating the current fuse by elastic force causes the outage device to form an open current.

5. An outage device comprises:

at least a thermal-sensitive connecting point, for sensing a temperature surrounding the thermal-sensitive connecting point;

a first connecting wire, connecting to the thermal-sensitive connecting point;

a current fuse, for detecting a current flowing through the current fuse, connecting to the thermal-sensitive point;

a second connecting wire, connecting to the current fuse; and an elastic device, contacting the current fuse and applying elastic force on the current fuse constantly, wherein the current fuse melts and forms a open circuit as the current exceeds a predetermined value, or the temperature fuse melts and forms a open circuit as the temperature exceeds a predetermined value, then the first connecting wire is separated from the current fuse by the elastic force.

6. The outage device of claim 5, wherein the elastic device includes a spring.

7. The outage device of claim 5, wherein the elastic device includes an elastic valve.

8. A surge protection used in parallel with a power supply of a circuit, comprising:

a surge-absorbing device for absorbing surges from the power supply; and an outage device, in series with the surge-absorbing device and separated from the surge absorbing device with a distance, for detecting a current flowing through the outage device and a temperature of the surge-absorbing device, the outage device further including, an overcurrent protection, in series with the surge-absorbing device, for detecting a current flowing through the overcurrent protection;

an overheat protection, in series with the overcurrent protection, for detecting the temperature of the single-absorbing device; and an elastic device contacting the overcurrent protection and applying elastic force to the overcurrent protection wherein under a situation in which either the current is too high or the temperature is too high, the elastic device separating the overcurrent protection by elastic force causes the outage device to be opened.

9. The outage device of claim 8, wherein the surge-absorbing device and the outage device are packaged as a single independent device.

10. The outage device of claim 8, wherein the overcurrent protection and the overheat protection are packaged into a single independent device.

11. The outage device of claim 8, wherein the overcurrent protection includes a current fuse.

12. The outage device of claim 8, wherein the overheat protection includes a temperature fuse.

13. The outage device of claim 8, wherein the surge-absorbing device includes a metal oxide varistor.

* * * * *